United States Patent [19]

Yamasaki

[11] 4,232,564

[45] Nov. 11, 1980

[54] BICYCLE SPEED CHANGE LEVER DEVICE
[75] Inventor: Kazuto Yamasaki, Osaka, Japan
[73] Assignee: Maeda Industries, Ltd., Osaka, Japan
[21] Appl. No.: 951,017
[22] Filed: Oct. 12, 1978
[30] Foreign Application Priority Data Oct. 14, 1977 [JP] Japan .................................. 52-123828

[51] Int. Cl.² .......................... G05G 5/06; G05G 5/16; G05G 5/18
[52] U.S. Cl. ........................................ 74/475; 74/489; 74/527; 74/531; 74/535; 188/68
[58] Field of Search ................. 74/489, 527, 531, 535, 74/475; 188/68, 82.77

[56] References Cited
U.S. PATENT DOCUMENTS

| 3,394,604 | 7/1968 | Kimura | 74/217 |
| 3,406,587 | 10/1968 | Brilando et al. | 74/527 X |
| 3,481,217 | 12/1969 | Maeda | 74/535 X |
| 3,693,469 | 9/1972 | Ozaki | 74/489 |
| 3,915,029 | 10/1975 | Shimada | 74/535 X |
| 3,943,794 | 3/1976 | Shimada | 74/531 X |

Primary Examiner—Allan D. Herrmann
Attorney, Agent, or Firm—Birch, Stewart, Kolasch & Birch

[57] ABSTRACT

A bicycle speed change lever device comprises a lever body pivotally mounted on a support shaft and having a handle portion and a base portion which is formed with internal hollow spaces, within which are disposed a step positioning mechanism including a resiliently urged engaging piece and a plurality of engaging recesses arranged so as to cooperate for retaining the lever body in a selected speed gear position, and a one-way clutch mechanism including means for permitting the lever body to pivotally move in one direction with reduced frictional resistance.

6 Claims, 7 Drawing Figures

BICYCLE SPEED CHANGE LEVER DEVICE

BACKGROUND AND SUMMARY OF THE INVENTION

The present invention relates to a speed change lever device for a bicycle, and more particularly to improvements in the speed change lever device which cooperates with a rear derailleur and a multi-speed free wheel assembly having a plurality of sprocket wheels of different diameter mounted on a rear axle of a bicycle, in order to switch over the running drive chain from one sprocket wheel to another for effecting the speed change.

In the art of bicycle speed change lever devices, it is well known that the lever handle must be retained in a selected speed gear position by such a retaining force as at least greater than the known tensile force of the rear derailleur. It is apparent that if the retaining force is considerably greater than said tensile force, it is very difficult to operate the lever handle quite smoothly. On the other hand, if the retaining force is smaller than the tensile force, the lever handle cannot be maintained in a selected speed gear position. Therefore, one of the important problems in the field is how to obtain the proper retaining force. Another important problem in the field is how to bring the handle lever selectively into an accurate speed gear position and retain it therein.

In order to solve the first problem, provision of a ratchet mechanism has proved to be effective, as disclosed in U.S. Pat. No. 3,693,469 to Ozaki. However, according to the method by Ozaki, the second problem remains unsolved. While, in order to solve the second problem, such a mechanism has been proposed which includes a clip-stop ball, a plurality of circular holes formed in a fixed control plate, and a spring element adapted for normally pressing said ball into selected one of said holes, as disclosed in U.S. Pat Nos. 3,362,238 to Hayashi, et al and 3,394,604 to Kimura. However, according to the clip-stop type methods, the first problem remains unsolved. According to the Kimura's method, the handle lever is retained in a desired position merely by forced engagement of the ball with one of the circular holes. Therefore, a considerable physical force is required for forcibly disengaging the ball out of the hole, since the ball must be forcibly rolled out of the hole by such a force applied in the direction transverse to the rolling out direction of the ball, in addition to the fact that said control plate must be forcibly pressed away by the ball so as to provide a certain space corresponding to the diameter of the ball for permitting the rolling out thereof. Further, when adjustment is made for securing a desired larger retaining force, it is always accompanied by undesirable increase of the force required for forcibly taking the ball out of the hole. Thus, it is difficult to achieve the very smooth speed change operation of the lever handle.

Accordingly, it is an object of the present invention to eliminate all of the above-discussed prior art deficiencies.

Another object of the invention is to provide an improved bicycle speed change lever device which can be retained properly in a selected speed gear position.

A further object of the invention is to provide an improved bicycle speed change lever device which can be operated quite smoothly with minimum physical force of an operator.

A still further object of the invention is to provide an improved bicycle speed change lever device which can be selectively brought into an accurate speed gear position and retained therein.

Other objects, features and advantages of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 2:
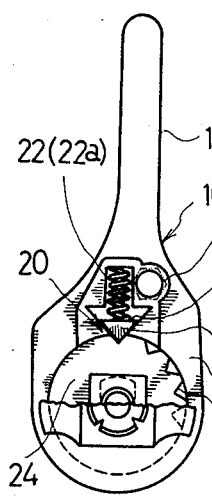
FIG. 2 is a partly cut away left-side elevation of the lever device shown in FIG. 1.

Referring now to the drawings, in particular to FIGS. 1 to 7, wherein identical reference numerals are used throughout the various views to indicate identical elements, a bicycle speed change lever device of the present invention essentially comprises a lever body 10, a step positioning mechanism 20, and a one-way clutch mechanism 30, all being cooperatively assembled together. The device of the invention further comprises some additional component elements to be hereinafter described.

The lever body 10 has a handle portion 11 and a base portion 12, the latter being formed with internal hollow spaces in which said mechanisms 20, 30 are disposed. The lever body 10 is pivotally mounted on a support shaft 13 which is rigidly connected at one end to a known fixing band 40 with which the lever device is secured to a bicycle frame tube 41. The shaft 13 is formed with an internally threaded axial hole 14 into which a threaded shank of a clamping screw 15 is inserted conventionally for engagement.

The step positioning mechanism 20 includes an engaging piece 21 adapted to be urged by a resilient means 22, and a plurality of engaging recesses 23 formed in plate 24 fixed in position at one side of said base portion 12. The recesses 23 are spaced apart from each other and aligned in order from low to top gear positions in an arc of a circle, in such a manner that, when the lever handle is operated for speed change, said engaging piece 21 can be engageably received in a selected one of the recesses 23. The number of the recesses 23 may be predetermined in accordance with the number of available speeds. For instance, when a bicycle to which the lever device is applied has a 5-speed system, the number of the recesses 23 should be at least five. Further each position of the recesses 23 should be predetermined so that the lever body 10 can always be retained in an accurate position at every speed change stage.

The one-way clutch mechanism 30 may be, for example, of such a type as including a ratchet 31 and a claw 32. The one-way clutch mechanisms per se are known and may be varied in many forms. It will be readily apparent to those skilled in the art that several other types of one-way clutch mechanisms, for example, such as a so-called clutch-spring type, a ball and cam-surface type or the like can be easily applicable to the device of the invention.

Figure 1:
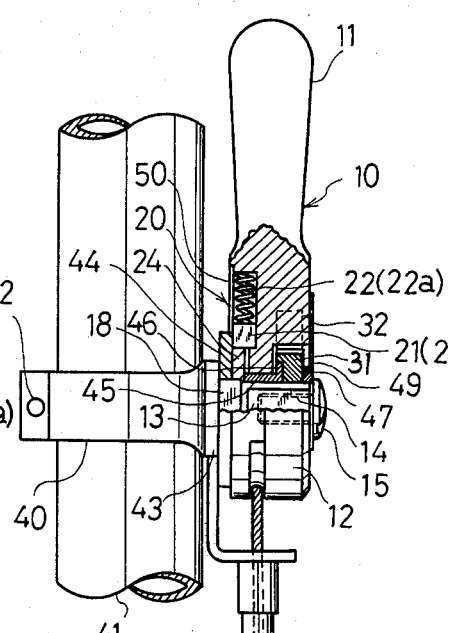
FIG. 1 is a front elevation with parts broken away, illustrating one embodiment of the bicycle speed change lever device according to the present invention, wherein the lever device is mounted on a bicycle frame tube.
Figure 3:
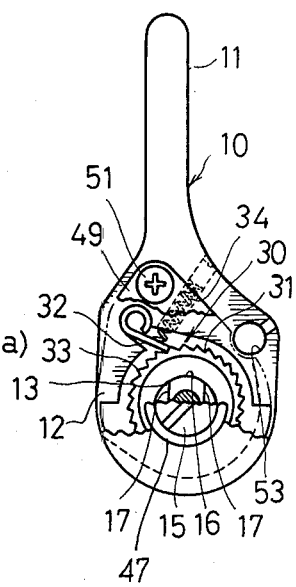
FIG. 3 is a partly cut away right-side elevation of the lever device of FIG. 1.

FIGS. 1 to 3 illustrate the first embodiment of the invention, wherein the lever device comprises a fixing band 40 which has one end provided with a known clamping means 42 including, for example, a screw and a nut, and the other end preferably formed with a known reinforcement 43 serving as a support seat to which an internally threaded shaft 13 is rigidly secured so as to extend therefrom, conventionally. The shaft 13 may be of a round shape with both sides cut away in cross section, so as to provide a pair of opposite round surfaces 16 (upper and lower) and a pair of opposite flat side surfaces 17. On the shaft 13 are mounted a first washer 44, said plate 24, a spacer sleeve 45 with an integral annular flange 46, said ratchet 31, and a second washer 47, all being formed with an axial hole and mounted in order in the manner to be hereinafter described. Said annular flange 46 and the second washer 47 are arranged so as to serve as means for imparting friction resistance to said ratchet 31.

If desired, said shaft 13 may be provided at one end with an integral reinforcement 18, which may be of square shape in cross section. In this case, the washer 44 and the plate 24 may be respectively formed with an axial square hole corresponding to the square configuration of said reinforcement 18, so that they are prevented from rotation when mounted on the reinforcement 18. Each axial hole of the sleeve 45 and the washer 47 may preferably be of such configuration as corresponding to the external configuration of the shaft 13 as described in the foregoing, so that the elements 45, 47 are also prevented from rotation by the function of said flat side surfaces 17 when mounted on the shaft 13. While, the ratchet 31 should be formed with a round axial hole so that it is rotatable on the shaft.

The base portion 12 is formed with internal hollow spaces at both sides as well as an axial hole. The inward hollow space of the base portion 12 is formed so as to house said step positioning mechanism 20 therein, while the outward hollow space is so formed as to house said one-way clutch mechanism 30 therein.

In the embodiment shown in FIGS. 1 to 3, the step positioning mechanism 20 is a combination of an engaging piece 21 in the form of a triangular slide piece 21a and a plurality of engaging recesses 23 in the form of a plurality of triangular notches 23a formed in the circumference of the plate 24, as particularly shown in FIG. 2. The triangular piece 21a is retained in position within the hollow space of the base portion 12 so as to be slidable along a suitable guide means 25 so that it is normally urged outward to come into engagement with selected one of the notches 23a by the function of the resilient means 22 in the form of a coil spring 22a, thereby the lever body 10 being maintained in a selected speed gear position. The piece 21a and the notches 23a are so arranged as to permit easy disengagement from each other when the lever handle is manually operated for speed change.

The one-way clutch mechanism 30 is a combination of a ratchet 31 and a cooperative claw 32. The ratchet 31 having engagement teeth 34 formed on the circumference thereof is rotatably mounted on the shaft 13 within the hollow space of said base portion 12. The claw 32 is operatively retained in position within the hollow space of said base portion 12, in such a manner that it permits the lever body 10 to freely rotate in one direction (opposite direction of an arrow P in FIG. 1), but prevents the lever body 10 from rotating in the same direction of the arrow P, that is the direction in which the control wire 48 is always pulled under a known pulling action by a conventional rear derailleur (not shown), through engagement with said teeth 33 by the aid of a spring 34 which is adapted to depress the claw 32 against the teeth 33, as particularly shown in FIG. 3.

After the mechanisms 20, 30 and other component elements such as the washers 44, 47 and the sleeve 45 have been arranged in position, the clamping screw 15 is adjustingly tightened to a desired degree so that appropriate frictional resistances are developed in contact surfaces between the washer 47 and the ratchet 31 and between said ratchet 31 and the sleeve 45, respectively. It should be understood that said annular flange 46 and said washer 47 are mere examples of means for imparting friction resistance to the ratchet 31 and that such means may be varied in many ways. For instance, said washer 47 may be replaced by a plastic friction plate (not shown). Otherwise, double washers may be utilized in the place of the single washer 47. Further, said flange 46 may be replaced by a suitable disk member serviceable as the friction resistance imparting means.

The base portion 12 of the lever body 10 may preferably be covered at both sides with cover plates 49, 50 which may be fixed to the base portion 12 by means of a set screw 51 and a nut 52, conventionally. Incidentally, reference numeral 53 (FIG. 3) denotes a fixing hole in which the terminal end of the control wire 48 is fixed.

Figure 4:
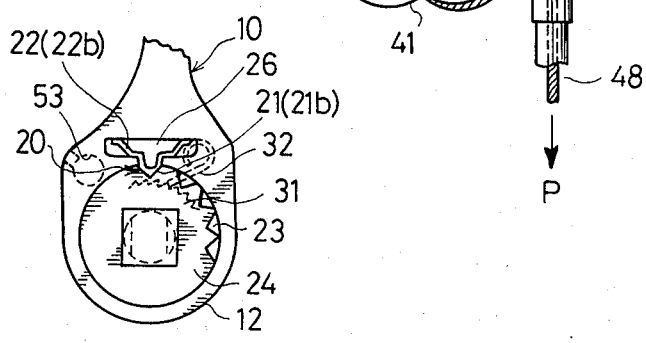
FIG. 4 is a fragmentary elevation showing a modification of the step positioning mechanism.

FIG. 4 illustrates the modification of the step positioning mechanism 20, wherein a plurality of recesses 23 formed in the plate 24 are the same as those of the first embodiment described in the foregoing, however, the engaging piece 21 is made of a metallic plate so formed as to provide a triangular protuberance 21b which is engageable as well as disengageable with said recesses 23 in the same manner as described. Further, the resilient means 22 is in the form of a plate spring 22b which is integral with said protuberance 21b and bent to develop a desired spring function for always urging said protuberance 21b outwardly. The plate spring 22b may be retained in a suitable recession 26 formed in the base portion 12 of the lever body 10.

Figures 5, 6:
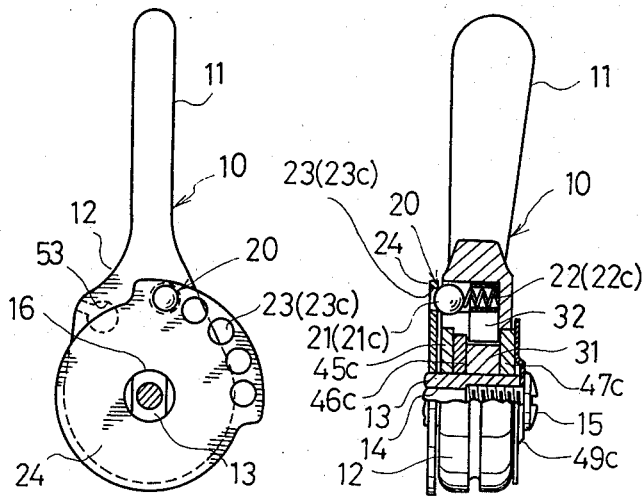
FIG. 5 is a front elevation, with parts broken away, illustrating a further embodiment of the present invention.
FIG. 6 is a left-side elevation of the lever device of FIG. 5.
Figure 7:
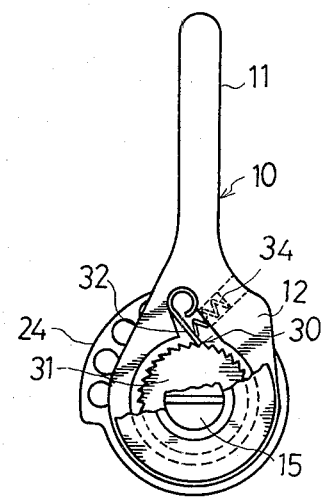
FIG. 7 is a right-side elevation of the lever device of FIG. 5.

FIGS. 5 to 7 illustrate a further embodiment of the present invention, wherein the step positioning mechanism 20 includes the engaging piece 21 in the form of a steel ball 21c, a plurality of engaging recesses 23 in the form of a plurality of circular holes 23c formed in a plate 24, and a resilient means 22 in the form of a coil spring 22c disposed so as to always urge the ball 21c outwardly. The diameter of each of the circular holes 23c should be predetermined so that less than one half of said ball 21c may be engageably received therein and can be easily disengaged therefrom when the lever handle is manually operated for speed change.

The one-way clutch mechanism 20 herein employed and illustrated in FIGS. 5 and 7 is substantially the same as that of the first embodiment, detailed construction of which has been fully described in the foregoing with reference to FIGS. 1 and 3, and therefore, further description is not repeated herein.

On the shaft 13, the plate 24, a spacer 45c, a first friction disk 46c, the ratchet 31, a second friction disk 47c are mounted in order in the substantially same manner as described in the foregoing. The functions of said disks 46c, 47c are substantially the same as those of the annular flange 46 and the washer 47. A cover plate 49c may be provided externally of said disk 47c.

In operation, if taking no account of a constant frictional resistance supposed to be existing among various contact parts of the lever device, it is apparent that the lever body 10 can be maintained in a select gear position by a certain retaining force ($F_1$) at least larger than the known tensile force ($F_2$) of rear derailleur which functions to always pull the control wire 48 in the direction of the arrow P. Said retaining force ($F_1$) is given approximately as the sum total of the frictional resistance ($T_1$) existing between one of the engaging recesses 23 and the engaging piece 21 urged by the resilient means 22 and the further frictional resistance ($T_2$) existing between the ratchet roller 31 and its adjacent parts 46, 47 or 46a, 47a developed by tightening the clamping screw 15. Thus, in order to pivotally move the lever body 10 for speed change, a certain physical force is supposed to be required which is at least greater than said retaining force. However, in actual operation, when the lever body 10 is manually turned in the counterclockwise direction, the claw 32 is permitted to freely slide on the ratchet 31 and said ratchet 31 itself does not rotate. Therefore, said frictional resistance ($T_2$) can be ignored. As a result, the operator can turn the lever body 10 merely by such a reduced physical force which is slightly larger than said frictional resistance ($T_1$).

On the other hand, when the lever body 10 is manually turned in the clockwise direction, the ratchet 31 must be rotated therewith. Thus, the operation is supposed to require such a physical force as at least greater than said frictional resistances ($T_1$) puls ($T_2$). However, in actual operation, said tensile force ($F_2$) of the rear derailleur can be utilized to reduce the required physical force by the value of ($F_2$), and yet said retaining force ($F_1$) need not be so greater than the tensile force ($F_2$). In other words, it is possible to minimize the value of ($F_1-F_2$). As a result, the operator is permitted to manually turn the lever body 10 in either directions with his minimum physical force.

Further, as compared with the prior art device, the frictional resistance ($T_1$) existing in the step positioning mechanism can be considerably decreased, resulting in that the engaging piece 21 is permitted to shift from one selected engaging recess 23 to another quite smoothly, without fear of unexpected disengagement of the piece 21 from the selected recess 23.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:
1. A bicycle speed change lever device comprising;
a lever body pivotally mounted on a support shaft and having a handle portion and a base portion which is formed with internal hollow spaces,
a step positioning mechanism disposed at one side of said base portion and including a resiliently urged engaging piece and a plurality of engaging recesses arranged so as to cooperate for retainging said lever body in a selected speed gear position,
a one-way clutch mechanism disposed within said internal hollow spaces and including means for permitting said lever body to pivotally move in one direction with reduced frictional resistance, and
means for imparting frictional resistance to rotation of said lever body.
2. The device, as set forth in claim 1, wherein said step positioning mechanism is a combination of a triangular slide piece, a resilient means for urging said triangular slide piece, and a plurality of triangular notches formed in circumference of a fixed plate.
3. The device, as set forth in claim 2, wherein said triangular slide piece is in the form of a triangular protuberance formed by bending a piece of metallic plate material, and said resilient means is in the form of a plate spring which is integral with said protuberance.
4. The device, as set forth in claim 1, wherein said step positioning mechanism is a combination of a ball, a resilient means for urging said ball, and a plurality of circular holes formed in a fixed plate, and wherein the diameter of each of said plurality of circular holes being not larger than the diameter of said ball.
5. The device, as set forth in claim 1, wherein said one-way clutch mechanism is a combination of a ratchet and a claw.
6. The device, as set forth in claim 5, wherein means are provided for imparting frictional resistance to said ratchet.

* * * * *